(12) United States Patent
Mori

(10) Patent No.: US 10,189,666 B2
(45) Date of Patent: Jan. 29, 2019

(54) SHEET TRAY AND IMAGE FORMING APPARATUS

(71) Applicant: Brother Kogyo Kabushiki Kaisha, Nagoya-shi, Aichi-ken (JP)

(72) Inventor: Kentaro Mori, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/881,244

(22) Filed: Jan. 26, 2018

(65) Prior Publication Data

US 2018/0215561 A1 Aug. 2, 2018

(30) Foreign Application Priority Data

Jan. 30, 2017 (JP) ................... 2017-014720

(51) Int. Cl.
*B65H 31/02* (2006.01)
*B65H 31/20* (2006.01)

(52) U.S. Cl.
CPC ............. *B65H 31/02* (2013.01); *B65H 31/20* (2013.01); *B65H 2402/31* (2013.01); *B65H 2402/35* (2013.01); *B65H 2405/354* (2013.01)

(58) Field of Classification Search
CPC .. B65H 31/02; B65H 31/20; B65H 2405/354; B65H 2402/31; B65H 2402/35
USPC ........................................................ 271/213
See application file for complete search history.

(56) References Cited

U.S. PATENT DOCUMENTS

| | | | | |
|---|---|---|---|---|
| 5,975,520 A | * | 11/1999 | Shim | B65H 1/04 271/145 |
| 6,742,949 B2 | * | 6/2004 | Youn | B41J 13/106 271/213 |
| 7,029,007 B2 | * | 4/2006 | Matsukawa | B41J 13/103 271/145 |
| 7,070,350 B2 | * | 7/2006 | Inokuchi | B41J 11/006 271/171 |
| 7,520,502 B2 | * | 4/2009 | Maeda | B41J 29/13 271/145 |
| 9,051,139 B2 | * | 6/2015 | Wang | B65H 1/04 |
| 9,387,702 B2 | * | 7/2016 | Poma | B41J 13/103 |

(Continued)

FOREIGN PATENT DOCUMENTS

JP H03-092645 U 9/1991
JP H05-278868 A 10/1993
(Continued)

*Primary Examiner* — Patrick Cicchino
(74) *Attorney, Agent, or Firm* — Banner & Witcoff, Ltd.

(57) ABSTRACT

A sheet tray includes a first tray, a second tray, and a third tray. The second tray is configured to move between a stored position and an extended position, relative to the first tray. The third tray is pivotable about the pivot shaft between a first stowed position and a first extended position, relative to the second tray. One of the first tray and the third tray includes a columnar portion. The columnar portion protrudes toward the other of the first tray and the third tray in an area where, when the second tray is at the stored position and the third tray is at the first stowed position, the first tray overlaps the third tray in an orthogonal direction. The other includes a cutout shaped along a path where the columnar portion moves when the third tray moves from the first stowed position to the first extended position.

14 Claims, 15 Drawing Sheets

(56) References Cited

U.S. PATENT DOCUMENTS

| | | | |
|---|---|---|---|
| 10,053,309 B2 * | 8/2018 | Washino | B65H 1/04 |
| 10,059,542 B2 * | 8/2018 | Ikegami | B65H 1/266 |
| 2003/0031495 A1 | 2/2003 | Youn | |
| 2004/0017460 A1 | 1/2004 | Kagami et al. | |
| 2005/0141936 A1 * | 6/2005 | Kawashima | G03G 15/6502 |
| | | | 399/392 |
| 2010/0124449 A1 * | 5/2010 | Asada | B65H 1/04 |
| | | | 399/393 |
| 2015/0042030 A1 * | 2/2015 | Washino | B65H 1/04 |
| | | | 271/3.14 |

FOREIGN PATENT DOCUMENTS

| | | |
|---|---|---|
| JP | 2002-241026 A | 8/2002 |
| JP | 2003-054818 A | 2/2003 |
| JP | 2004-035248 A | 2/2004 |
| JP | 2006-219304 A | 8/2006 |
| JP | 2011-235986 A | 11/2011 |
| JP | 2014-196166 A | 10/2014 |
| JP | 2015-034067 A | 2/2015 |

* cited by examiner

SHEET TRAY AND IMAGE FORMING APPARATUS

CROSS-REFERENCE TO RELATED APPLICATION

This application claims priority from Japanese Patent Application No. 2017-014720 filed on Jan. 30, 2017, the content of which is incorporated herein by reference in its entirety.

TECHNICAL FIELD

Aspects of the disclosure relate to a sheet tray configured to support a sheet thereon and an image forming apparatus including the sheet tray.

BACKGROUND

In some image forming apparatuses such as printers and copiers, a sheet is conveyed from a tray (a sheet tray) to an image forming device where an image is formed on the sheet.

A known image forming apparatus includes a casing and a tray protruding from a side of the casing and supported by the side of the casing. The tray includes a base-side mounting table extending from the side of the casing and a distal-side mounting table connected to the base-side mounting table. The distal-side mounting table is rotatable between a folded position where the distal-side mounting table is folded on the base-side mounting table and an unfolded position where the distal-side mounting table is unfolded from the base-side mounting table and extends in an extending direction. The distal-side mounting table includes two receiving levers at its distal end. The receiving levers are rotatable between a stowed position where the levers are aligned with the distal end of the distal-side mounting table and a receiving position where the levers are angled to the distal end.

With this configuration, in a non-use state, the distal-side mounting table is folded on the base-side mounting table and the receiving levers are located at the stowed position, and thus the tray becomes compact in size. In a use state, the distal-side mounting table is unfolded from the base-side mounting table and the receiving levers are located at the receiving position, the base-side mounting table, and the distal-side mounting table and the receiving levers are capable of supporting a sheet which is long in the extending direction thereon.

SUMMARY

To change the tray from the non-use state to the use state, however, two steps are needed: unfolding of the distal-side mounting table from the base-side mounting table; and rotating of each lever from the stowed position to the receiving position.

Illustrative aspects of the disclosure provide a sheet tray changeable from a non-use state to a use state in a single step and an image forming apparatus including the sheet tray.

According to an aspect of the disclosure, a sheet tray includes a first tray, a second tray, and a third tray. The first tray includes a first surface extending in a first direction and a second direction orthogonal to the first direction, and a first guide portion extending along the first surface in the first direction. The second tray includes a second surface extending parallel to the first surface, and a second guide portion slidably engaging the first guide portion. The second tray is configured to move between a stored position where the second surface overlaps the first surface of the first tray in an orthogonal direction to the first surface and an extended position where an overlap between the first surface and the second surface is smaller in the first direction than the overlap between the first surface and the second surface with the second tray at the stored position. The third tray includes a third surface extending parallel to the second surface. The third tray is pivotally supported by the second surface of the second tray via a pivot shaft extending in the orthogonal direction. The third tray is pivotable about the pivot shaft between a first stowed position where the third surface overlaps the second surface in the orthogonal direction and a first extended position where an overlap between the third surface and the second surface is smaller than the overlap between the third surface and the second surface when the third tray is at the first stowed position. One of the first tray and the third tray includes a columnar portion extending in the orthogonal direction. The columnar portion protrudes toward the other of the first tray and the third tray in an area where, when the second tray is located at the stored position and the third tray is located at the first stowed position, the first tray overlaps the third tray in the orthogonal direction. The other of the first tray and the third tray includes a cutout shaped along a path where the columnar portion moves when the third tray moves from the first stowed position to the first extended position.

This structure enables the sheet tray to change from a non-use state to a use state in a single step of moving the second tray from the stored position to the extended position.

According to another aspect of the disclosure, an image forming apparatus includes an image forming apparatus configured to form an image on a sheet, and a sheet tray configured to support thereon the sheet conveyed to the image forming device. The sheet tray includes a first surface extending in a first direction and a second direction orthogonal to the first direction, and a first guide portion extending along the first surface in the first direction. The second tray includes a second surface extending parallel to the first surface, and a second guide portion slidably engaging the first guide portion. The second tray is configured to move between a stored position where the second surface overlaps the first surface of the first tray in an orthogonal direction to the first surface and an extended position where an overlap between the first surface and the second surface is smaller in the first direction than the overlap between the first surface and the second surface with the second tray at the stored position. The third tray includes a third surface extending parallel to the second surface. The third tray is pivotally supported by the second surface of the second tray via a pivot shaft extending in the orthogonal direction. The third tray is pivotable about the pivot shaft between a first stowed position where the third surface overlaps the second surface in the orthogonal direction and a first extended position where an overlap between the third surface and the second surface is smaller than the overlap between the third surface and the second surface when the third tray is at the first stowed position. One of the first tray and the third tray includes a columnar portion extending in the orthogonal direction. The columnar portion protrudes toward the other of the first tray and the third tray in an area where, when the second tray is located at the stored position and the third tray is located at the first stowed position, the first tray overlaps the third tray in the orthogonal direction. The other of the first tray and the third tray includes a cutout shaped along a path where the columnar portion moves when the third tray moves from the first stowed position to the first extended position.

This structure enables the sheet tray to change from a non-use state to a use state in a single step of moving the second tray from the stored position to the extended position.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

An illustrative embodiment of the disclosure will be described with reference to the accompanying drawings.

<Image Forming Apparatus>

Figure 1:
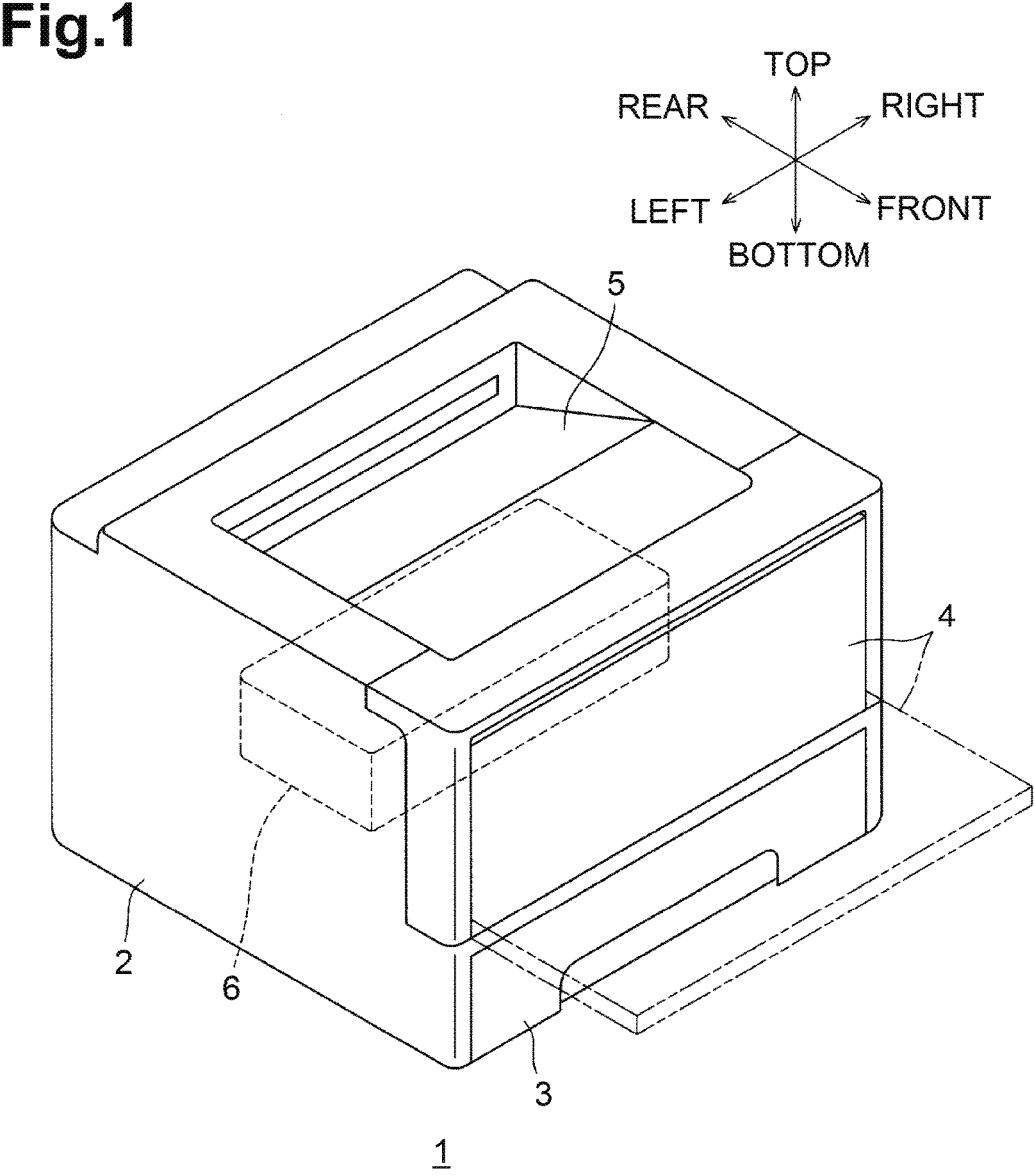
FIG. 1 is a perspective view from the front and left of a printer according to an embodiment of the disclosure.

As illustrated in FIG. 1, a printer 1 as an example of an image forming apparatus includes a substantially box-shaped housing 2.

The printer 1 further includes a feed tray 3, a multi-purpose tray 4 (an example of a sheet tray), a discharge tray 5, and an image forming device 6. The feed tray 3 is disposed at a bottom portion of the housing 2. The feed tray 3 is configured to support one or more sheets thereon. The front of the housing 2 contains the multi-purpose tray 4. The multi-purpose tray 4 is movable between a closed position (indicated by a solid line in FIG. 1) where the multi-purpose tray 4 is closed along the front of the housing 2, and an open position (indicated by a double dotted line in FIG. 1) where the multi-purpose tray 4 is tilted frontward from the closed position. The multi-purpose tray 4 is configured to, when located at the open position, support one or more sheets thereon. The discharge tray 5 is defined at the top of the housing 2. The image forming device 6 is accommodated in the housing 2. A sheet is singly fed and conveyed from the feed tray 3 or the multi-purpose tray 4 through the image forming device 6 toward the discharge tray 5. While the sheet is conveyed in the housing 2, the image forming device 6 forms a color or monochrome image on the sheet. The image forming device 6 may be of electrophotographic type, inkjet type, or other image formation type. The sheet having an image is discharged onto the discharge tray 5.

In the following description, a side of the housing 2 where the multi-purpose tray 4 is provided may be defined as the front or front side of the laser printer 1 and its opposite side may be defined as the rear or rear side of the printer 1. As illustrated in FIG. 1, the top or upper side, the bottom or lower side, right or right side, and the left or left side of the printer 1 will be identified as indicated by the arrows, based on the printer 1 viewed from the front side. Sides of the multi-purpose tray 4 will be identified as indicated by the arrows, based on that a cover tray 11 (FIG. 2) of the multi-purpose tray 4 is located at an open position.

<Multi-Purpose Tray>

Figure 2:
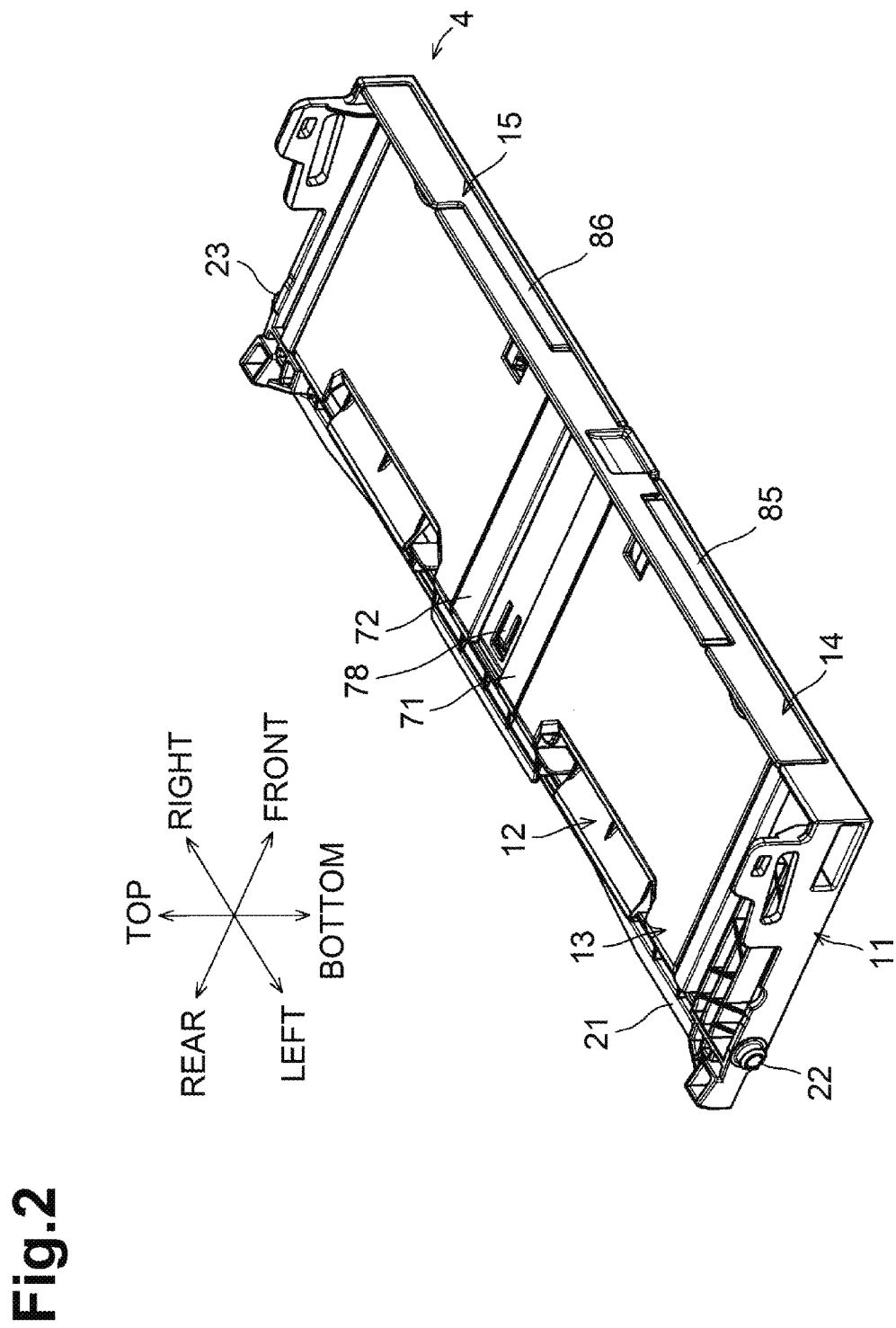
FIG. 2 is a perspective view from the front left of a multi-purpose tray of the printer, wherein a cover tray is open, a first slide tray is located at an accommodated position, a second slide tray is located at a stored position, and two pivotable trays are located at a first stowed position and a second stowed position, respectively.
Figure 3:
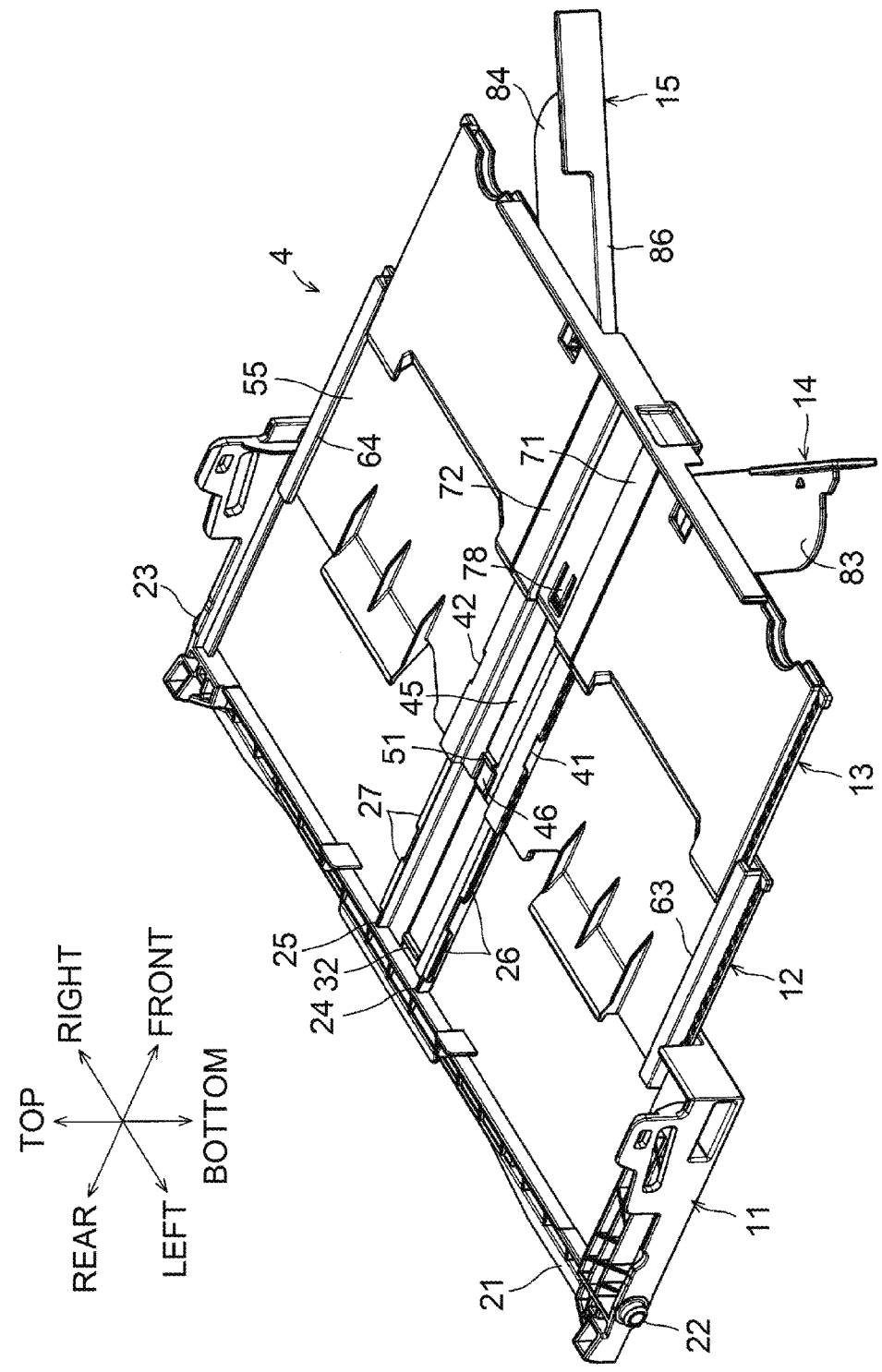
FIG. 3 is a perspective view from the front left of the multi-purpose tray of the printer, wherein the cover tray is open, the first slide tray is located at an exposed position, the second slide tray is located at an extended position, and the pivotable trays are located at a first extended position and a second extended position, respectively.
Figure 4:
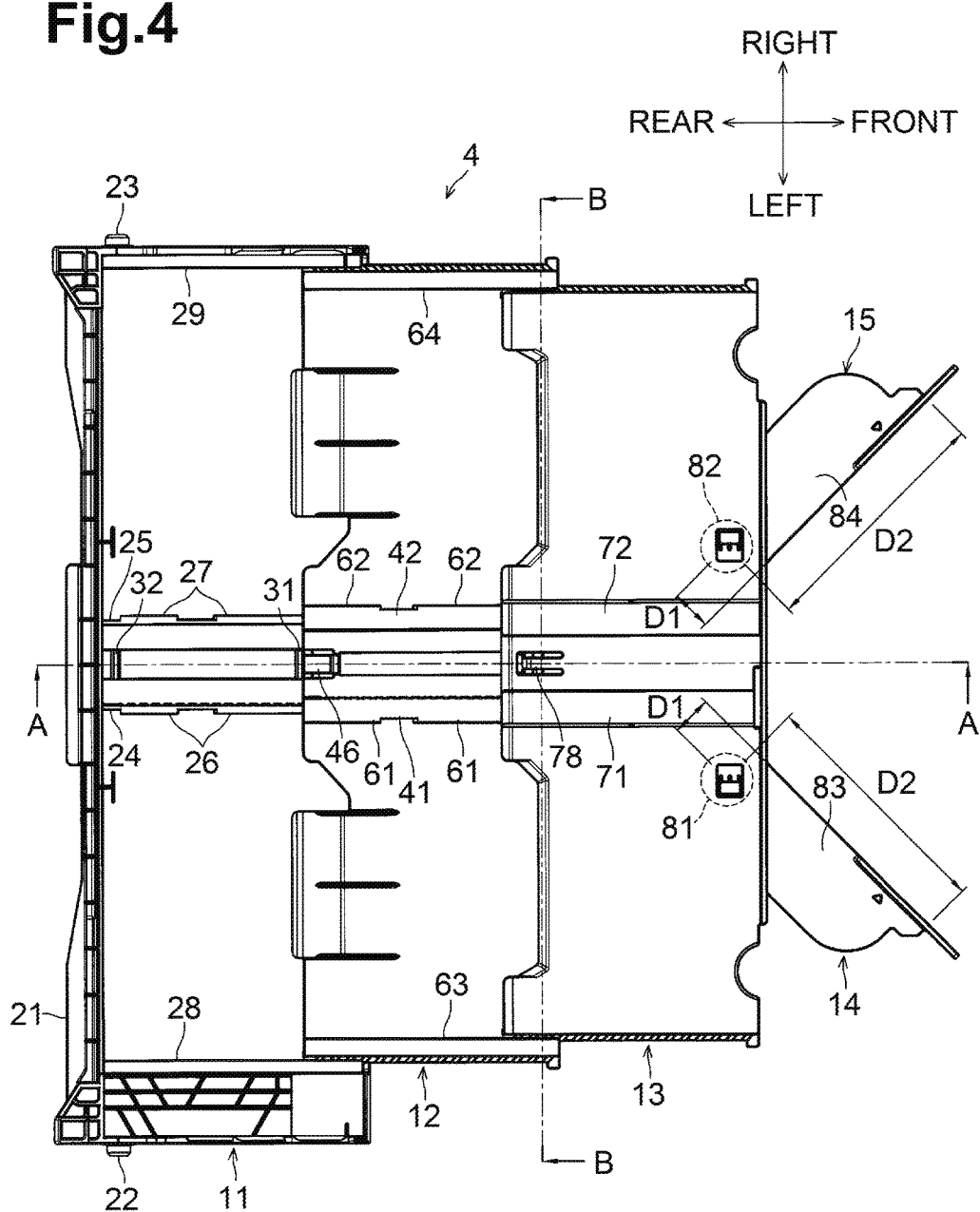
FIG. 4 is a plan view of the multi-purpose tray illustrated in FIG. 3.

As illustrated in FIGS. 2, 3, and 4, the multi-purpose tray 4 includes the cover tray 11, a first slide tray 12 (an example of a first tray), a second slide tray 13 (an example of a second tray), and first and second pivotable trays 14, 15 (an example of a third tray and a fourth tray).

<Cover Tray>

The cover tray 11 is a base end portion of the multi-purpose tray 4. The cover tray 11 includes an outer tray 21 and an inner tray (not illustrated). The outer tray 21 has an outer surface constituting a front surface of the housing 2 when the multi-purpose tray 4 is located at a closed position. The inner tray faces and is spaced apart from an inner surface of the outer tray 11.

The outer tray 21 has a rectangular plate shape. As illustrated in FIG. 4, the outer tray 21 includes a left pivot shaft 22 and a right pivot shaft 23 in a proximal end portion of the outer tray 21 (which is a rear end portion of the outer tray 21 when the multi-purpose tray 4 is open). The left pivot shaft 22 protrudes leftward from the left side surface of the outer tray 21 and the right pivot shaft 23 protrudes rightward from the right side surface of the outer tray 21. The left pivot shaft 22 and the right pivot shaft 23 are rotatably supported by the housing 2, and thus the cover tray 11 is pivotally supported by the housing 2.

The outer tray 21 includes a left guide rail 24 and a right guide rail 25 in a central portion of the inner surface in the left-right direction. The left guide rail 24 and the right guide rail 25 are disposed to the left and right of the center of the outer tray 21 in the left-right direction, respectively, and extend parallel to each other in a direction (front-rear direction) orthogonal to the left-right direction.

The left guide rail 24 includes, at its upper end portion, restriction portions 26 spaced apart in the front-rear direction. The right guide rail 25 includes, at its upper end portion, restriction portions 27 spaced apart in the front-rear direction. The restriction portions 26 protrude to the left of the left guide rail 24 and extend in the front-rear direction, and the restriction portions 27 protrude to the right of the right guide rail 25 and extend in the front-rear direction.

Figure 6:
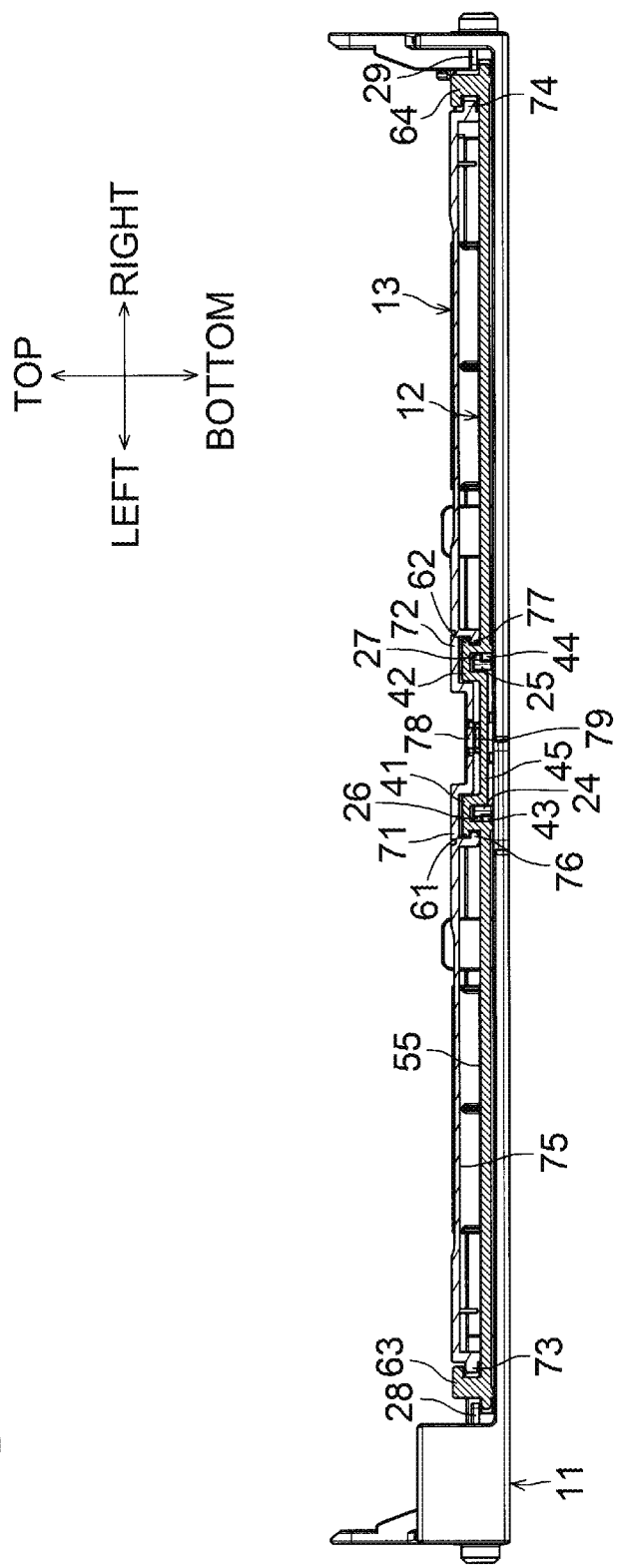
FIG. 6 is a cross sectional view of the multi-purpose tray taken along line B-B of FIG. 4.

As illustrated in FIGS. 4 and 6, the outer tray 21 includes an end restriction portion 28 at its left end portion and an end restriction portion 29 at its right end portion. The end restriction portions 28, 29 are shaped like a plate extending in the front-rear direction. The inner surface of the outer tray 21 and each of the end restriction portions define a space therebetween.

Figure 5:
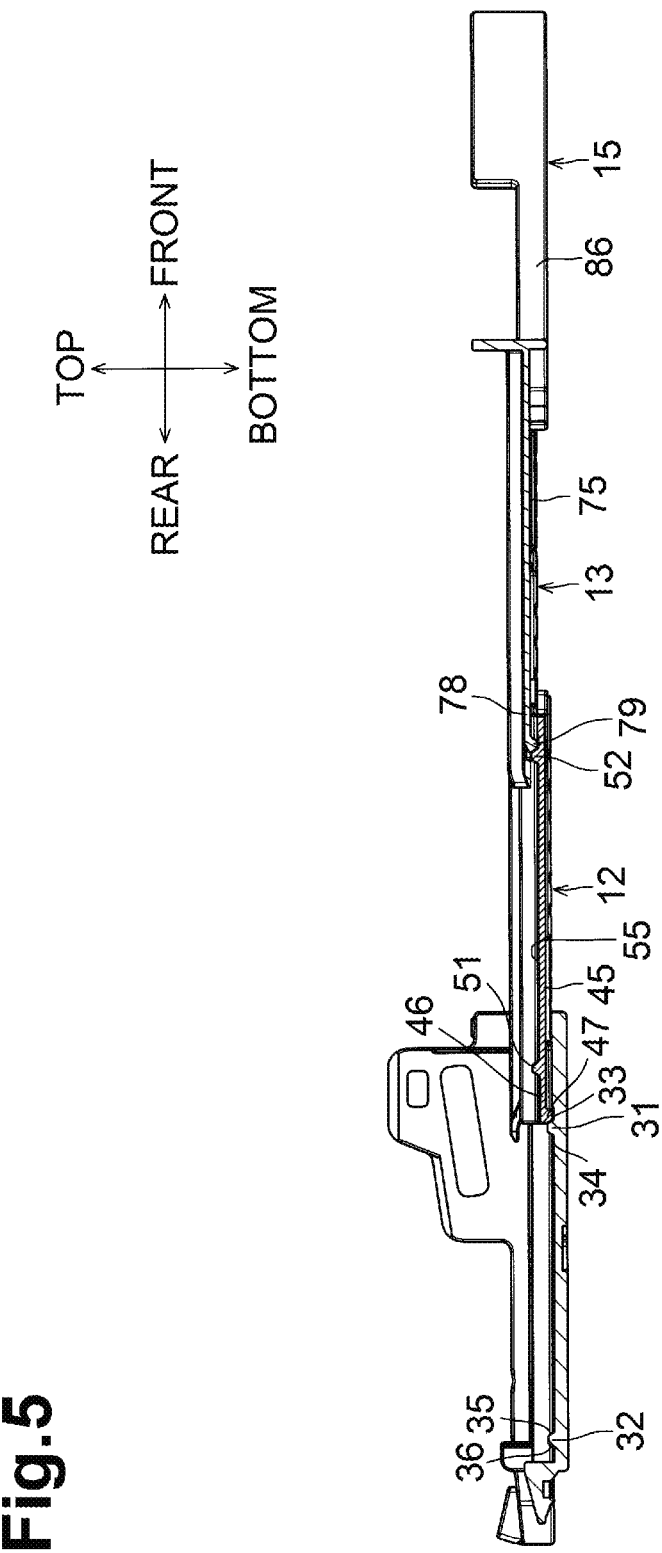
FIG. 5 is a cross sectional view of the multi-purpose tray taken along line A-A of FIG. 4.

As illustrated in FIG. 4, a raised portion 31 is located between distal end portions (front end portions) of the left guide rail 24 and the right guide rail 25 and a raised portion 32 is located between proximal end portions (rear end portions) of the left guide rail 24 and the right guide rail 25. As illustrated in FIG. 5, the raised portion 31 is raised from the inner surface of the outer tray 21 and includes a front inclined surface 33 inclined downward to the front and a rear inclined surface 34 inclined downward to the rear. The raised portion 31 thus has a trapezoidal cross section. The raised portion 32 is raised from the inner surface of the outer tray 21 and includes a front inclined surface 35 inclined downward to the front and a rear inclined surface 36 inclined downward to the rear. The raised portion 32 thus has a trapezoidal cross section.

<First Slide Tray>

As illustrated in FIGS. 3 and 4, the first slide tray 12 is shaped like a rectangular plate and smaller in size than the cover tray 11. The first slide tray 12 includes central guide portions 41, 42 (an example of a first guide portion) at its central portion in the left-right direction. As illustrated in FIG. 6, the central guide portions 41, 42 are substantially U-shaped in cross section. The central guide portion 41 engages, i.e., covers, left, right, and upper sides of the left guide rail 24 of the cover tray 11, and the central guide portion 42 engages, i.e., covers, left, right, and upper sides of the right guide rail 25 of the cover tray 11. This configuration enables the central guide portions 41, 42 to be guided by the left guide rail 24 and the right guide rail 25, respectively. Thus, the first slide tray 12 is slidable between an accommodated position and an exposed position frontward of the accommodated position. At the accommodated position, the first slide tray 12 is accommodated between the outer tray 21 and the inner tray (not illustrated). At the exposed position, the first slide tray 12 is exposed from the cover tray 11.

The central guide portion 41 includes a restricted portion 43. The central guide portion 42 includes a restricted portion 44. Irrespective of the position of the first slide tray 12 with respect to the cover tray 11 in the front-rear direction (or a slide direction), the restricted portion 43 faces one of the restriction portions 26 of the left guide rail 24 from below, and the restricted portion 44 faces one of the restriction portions 27 of the right guide rail 25 from below. A left end portion of the first slide tray 12 is engaged between the inner surface of the outer tray 21 and the end restriction portion 28, and a right end portion of the first slide tray 12 is engaged between the inner surface of the outer tray 21 and the end restriction portion 29. Thus, the restriction portions 26 of the outer tray 21 face the restricted portion 43 from above, and the restriction portions 27 of the outer tray 21 face the restricted portion 44 from above. The end restriction portion 28 of the outer tray 21 faces the left end portion of the first slide tray 12 from above, and the end restriction portion 29 of the outer tray 21 faces the right end portion of the first slide tray 12 from above. This configuration prevents or reduces the first slide tray 12 from moving apart upward from the outer tray 21.

In the first slide tray 12, a central portion 45 located between the central guide portions 41, 42 is recessed further downward and thinner than the central guide portions 41, 42.

The thin central portion 45 includes a claw portion 46 at the rear end portion. As illustrated in FIG. 4, the claw portion 46 is defined by a U-shaped slit formed by connecting, at a location close to the rear end of the central portion 45, two slits each extending from the location close to the rear end of the central portion 45 toward the front. Thus, the rear end of the claw portion 46 is a free end. The rear end portion of the claw portion 46 includes a protrusion 47 protruding downward.

When the first slide tray 12 is located at the accommodated position, the protrusion 47 of the claw portion 46 is located to the rear of the raised portion 32 of the cover tray 11. When the first slide tray 12 is located at the exposed position, the protrusion 47 of the claw portion 46 is located to the front of the raised portion 31 of the cover tray 11. When the first slide tray 12 moves between the accommodated position and the exposed position, the claw portion 46 becomes deformed, and the protrusion 47 rides on one of the raised portions 31, 32. When the protrusion 47 moves over the one of the raised portions 31, 32, the claw portion 46 returns to its original shape. This configuration provides a user with tactile feedback when the user starts to slide the first slide tray 12 from one of the accommodated position and the exposed position to the other. In addition, this configuration enables the first slide tray 12 to be maintained at the accommodated position or the exposed position.

The central portion 45 includes raised portions 51, 52 (an example of a second raised portion).

Figure 7:
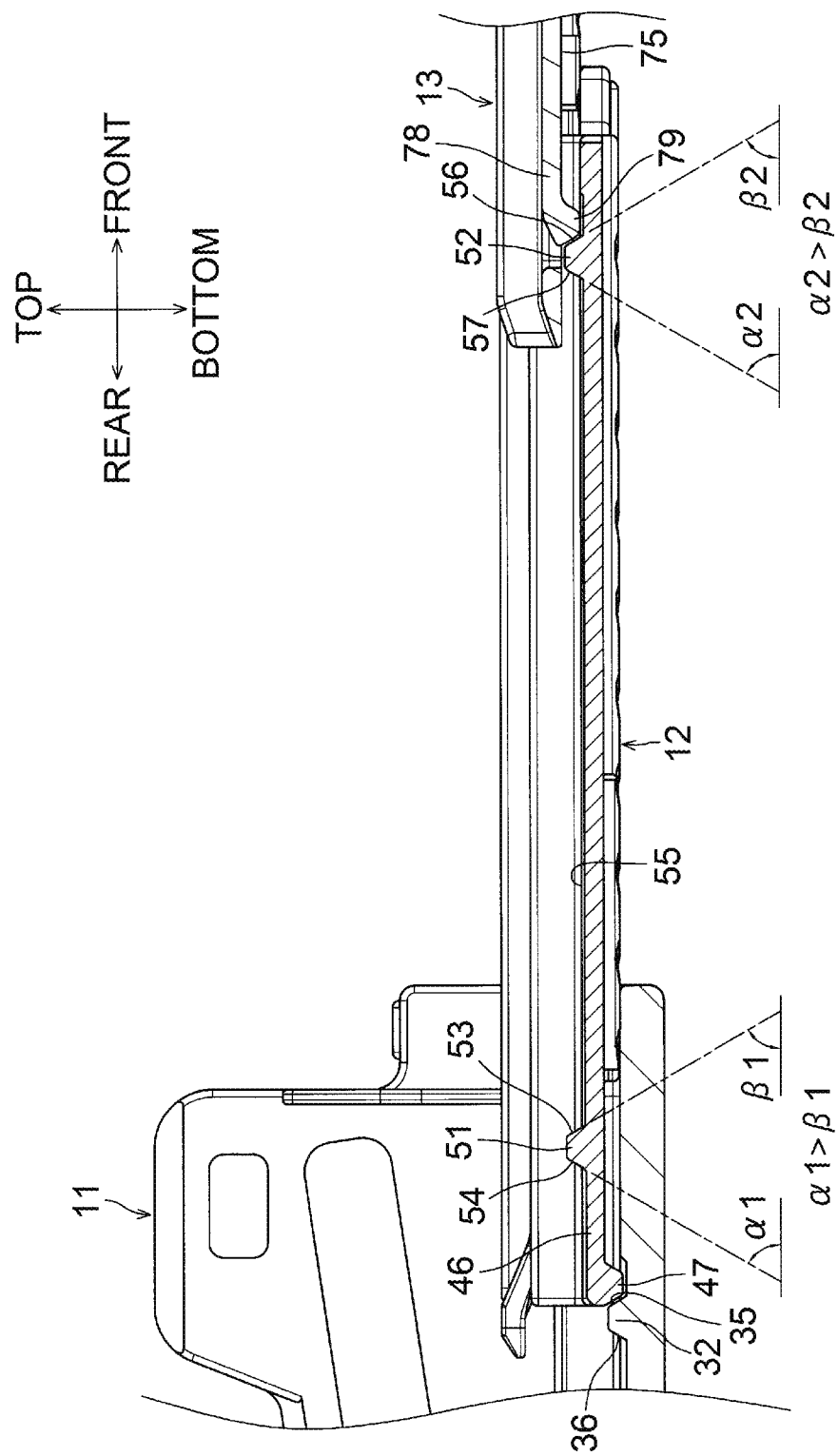
FIG. 7 is an enlarged cross sectional view of the multi-purpose tray illustrated in FIG. 5.

As illustrated in FIG. 7, the raised portion 51 is located further to the front than the claw portion 46. The raised portion 51 is raised upward from the upper surface of the central portion 45, and includes a front inclined surface 53 (an example of a third inclined surface) inclined downward to the front and a rear inclined surface 54 (an example of a fourth inclined surface) inclined downward to the rear. The raised portion 51 thus has a trapezoidal cross section. An angle $\alpha 1$ formed between the upper surface 55 (an example of a first surface) of the first slide tray 12 and the rear inclined surface 54 is greater than an angle $\beta 1$ formed between the upper surface 55 and the front inclined surface 53.

The raised portion 52 is located at a front end portion of the central portion 45. The raised portion 52 is raised from the upper surface of the central portion 45, and include a front inclined surface 56 (an example of a first inclined surface) inclined downward to the front and a rear inclined surface 57 (an example of a second inclined surface) inclined downward to the rear. The raised portion 52 thus has a trapezoidal cross section. An angle β32 formed between an upper surface 55 of the first slide tray 12 and the front inclined surface 56 is greater than an angle α2 formed between the upper surface 55 and the rear inclined surface 57.

As illustrated in FIGS. 4 and 6, the central guide portion 41 includes, at its upper end portion, restriction portions 61 (an example of a first restriction portion), and the central guide portion 42 includes, at its upper end portion, restriction portions 62 (an example of a first restriction portion). The restriction portions 61 protrude to the left of the central guide portion 41 and extend in the front-rear direction, and the restriction portions 62 protrude to the right of the central guide portion 42 and extend in the front-rear direction.

The first slide tray 12 includes a left end guide portion 63 (an example of a first guide portion) at the left end portion and a right end guide portion 64 (an example of a first guide portion) at the right end portion. The left end guide portion 63 extends upright from the first slide tray 12, bends to the right, and thus has substantially an L-shaped cross section. The right end guide portion 64 extends upright from the first slide tray 12, bends to the left, and thus has substantially an L-shaped cross section.

<Second Slide Tray>

As illustrated in FIG. 4, the second slide tray 13 is shaped like a rectangular plate and smaller in size than the first slide tray 12. The second slide tray 13 includes central guide portions 71, 72 (an example of a second guide portion) at its central portion in the left-right direction. As illustrated in FIG. 6, the central guide portions 71, 72 each have substantially a U-shaped cross section. The central guide portion 71 engages, i.e., covers, left, right, and upper sides of the central guide portion 41 of the first slide tray 12, and the central guide portion 72 engages, i.e., covers, left, right, and upper sides of the central guide portion 42 of the first slide tray 12. The second slide tray 13 further includes a left end guide portion 73 (an example of a second guide portion) at the left end portion and a right end guide portion 74 (an example of a second guide portion) at the right end portion. The left end guide portion 73 and the right end guide portion 74 are shaped like a plate extending in the left-right direction and the front-rear direction. The left end guide portion 73 is engaged between the upper surface 55 of the first slide tray 12 and the left end guide portion 63. The right end guide portion 74 is engaged between the upper surface 55 of the first slide tray 12 and the right end guide portion 64. Thus, the central guide portions 71, 72 are guided by the central guide portion 41, 42, respectively, and the left end guide portion 73 and the right end guide portion 74 are guided by the left end guide portion 63 and the right end guide portion 64, respectively. This configuration enables the second slide tray 13 to slidably move between a stored position where a lower surface 75 (an example of a second surface) of the second slide tray 13 overlaps the upper surface 55 of the first slide tray 12 from above and an extended position where the second slide tray 13 is moved frontward from the stored position so that an overlap between the lower surface 75 of the second slide tray 13 and the upper surface 55 of the first slide tray 12 is smaller than the overlap therebetween when the second slide tray 13 is located at the stored position.

The central guide portion 71 includes a restricted portion 76, and the central guide portion 72 includes a restricted portion 77 (the restricted portions 76, 77 are an example of a second restriction portion). Irrespective of the position of the second slide tray 13 with respect to the first slide tray 12 in the front-rear direction, the restricted portion 76 faces one of the restriction portions 61 of the first slide tray 12 from below, and the restricted portion 77 faces one of the restriction portions 62 of the first slide tray 12 from below. In other words, at least one of the restriction portions 61 of the first slide tray 12 faces the restricted portion 76 of the second slide tray 13 from above, and at least one of the restriction portions 62 of the first slide tray 12 faces the restricted portion 77 of the second slide tray 13 from above. The left end guide portion 63 of the first slide tray 12 faces the left end portion of the second slide tray 13 from above, and the right end guide portion 64 of the first slide tray 12 faces the right end portion of the second slide tray 13 from above. This configuration prevents or reduces the second slide tray 13 from moving upward away from the first slide tray 12.

As illustrated in FIG. 4, the second slide tray 13 includes a claw portion 78 located between rear end portions of the central guide portions 71, 72. The claw portion 78 is defined by a U-shaped slit formed by connecting, at a location close to the rear end of a central portion of the second slide tray 13, two slits each extending in the front-rear direction. Thus, the rear end of the claw portion 78 is a free end. The rear end of the claw portion 78 includes a protrusion 79 protruding downward.

When the second slide tray 13 is located at the stored position, the protrusion 79 of the claw portion 78 is located to the rear of the raised portion 51 of the first slide tray 12. When the second slide tray 13 is located at the extended position, the protrusion 79 of the claw portion 78 is located to the front of the raised portion 52 of the first slide tray 12. When the protrusion 79 moves over one of the raised portions 51, 52, the claw portion 78 becomes deformed, and the protrusion 79 rides on the one of the raised portions 51, 52. When the protrusion 79 moves over the one of the raised portions 51, 52, the claw portion 78 returns to its original shape. This configuration provides a user with tactile feedback when the user starts to slide the second slide tray 13 from one of the stored position and the extended position to the other.

At the raised portion 51, the angle α1 of the rear inclined surface 54 is greater than the angle β1 of the front inclined surface 53. Thus, a greater force is required to slide the second slide tray 13 when the protrusion 79 moves over the raised portion 51 from its rear side, which is closer to the stored position than its front side, than when the protrusion 79 moves over the raised portion 51 from its front side, which is closer to the extended position than its rear side. At the raised portion 52, the angle β32 of the front inclined surface 56 is greater than the angle α2 of the rear inclined surface 57. Thus, a greater force is required to slide the second slide tray 13 when the protrusion 79 moves over the raised portion 52 from its front side than when the protrusion 79 moves over the raised portion 52 from its rear side.

In addition, the central portion 45 of the first slide tray 12 is recessed downward further than surrounding areas of the central portion 45. This configuration prevents the protrusion 79 from contacting the central portion 45 while the protrusion 79 moves between the raised portions 51, 52.

Thus, this configuration enables the second slide tray 13 to be maintained at the stored position or the extended position so as not to move easily. This configuration also enables the first slide tray 12 to be smoothly slid with a small force after the protrusion 79 of the claw portion 78 moves over the raised portions 51, 52. In addition, the protrusion 79 does not contact central portion 45 while the protrusion 79 moves between the raised portions 51, 52. This prevents permanent deformation of the claw portion 78.

<Pivotable Trays>

As illustrated in FIGS. 3 and 4, two pivotable trays 14, 15 are attached to the front end portion of the second slide tray 13 symmetrically with respect to the central guide portions 71, 72 in the left-right direction. The pivotable trays 14, 15 are pivotally supported by the lower surface 75 of the second slide tray 13.

The pivotable trays 14, 15 are each shaped like a plate. As illustrated in FIGS. 4, 8, 9, 10, and 11, pivot shafts 81, 82 are located at the front end portion of the lower surface 75 of the second slide tray 13. The pivot shaft 81 is located to the left from the central guide portion 71, the pivot shaft 82 is located to the right from the central guide portion 72, and a distance from the pivot shaft 81 to the central guide 71 is equal to a distance from the pivot shaft 82 to the central guide 72.

The left pivotable tray 14 is pivotally supported by the lower surface 75 of the second slide tray 13 via the pivot shaft 81 inserted with a play through one end portion of the left pivotable tray 14 and the second slide tray 13. As illustrated in FIG. 4, the left pivotable tray 14 has an upper surface 83 (an example of a third surface) extending parallel to the lower surface 75 of the second slide tray 13. The upper surface 83 has a dimension D2 in its longitudinal direction. The dimension D2 is longer than a dimension D1 measured between a center of the pivot shaft 81 and a front end of the second slide tray 13. The left pivotable tray 14 is pivotable about the pivot shaft 81 between a first stowed position where the left pivotable tray 14 extends to the left from the pivot shaft 81 and the upper surface 83 overlaps the lower surface 75 of the second slide tray 13 from below, and a first extended position where the left pivotable tray 14 extends to the front left from the pivot shaft 81 so that an overlap between the upper surface 83 and the lower surface 75 is smaller than the overlap therebetween when the left pivotable tray 14 is located at the first stowed position.

The right pivotable tray 15 is pivotally supported by the lower surface 75 of the second slide tray 13 via the pivot shaft 82 inserted with a play through one end portion of the right pivotable tray 15 and the second slide tray 13. The right pivotable tray 15 has an upper surface 84 (an example of a fourth surface) extending parallel to the lower surface 75 of the second slide tray 13. The upper surface 84 has a dimension D2 in its longitudinal direction. The dimension D2 is longer than a dimension D1 measured between a center of the pivot shaft 82 and the front end of the second slide tray 13. The right pivotable tray 15 is pivotable about the pivot shaft 82 between a second stowed position where the right pivotable tray 15 extends to the right from the pivot shaft 82 and the upper surface 84 overlaps the lower surface 75 of the second slide tray 13 from below, and a second extended position where the right pivotable tray 15 extends to the front left from the pivot shaft 82 so that an overlap between the upper surface 83 and the lower surface 75 is smaller than the overlap therebetween when the right pivotable tray 15 is located at the second stowed position.

Figure 8:
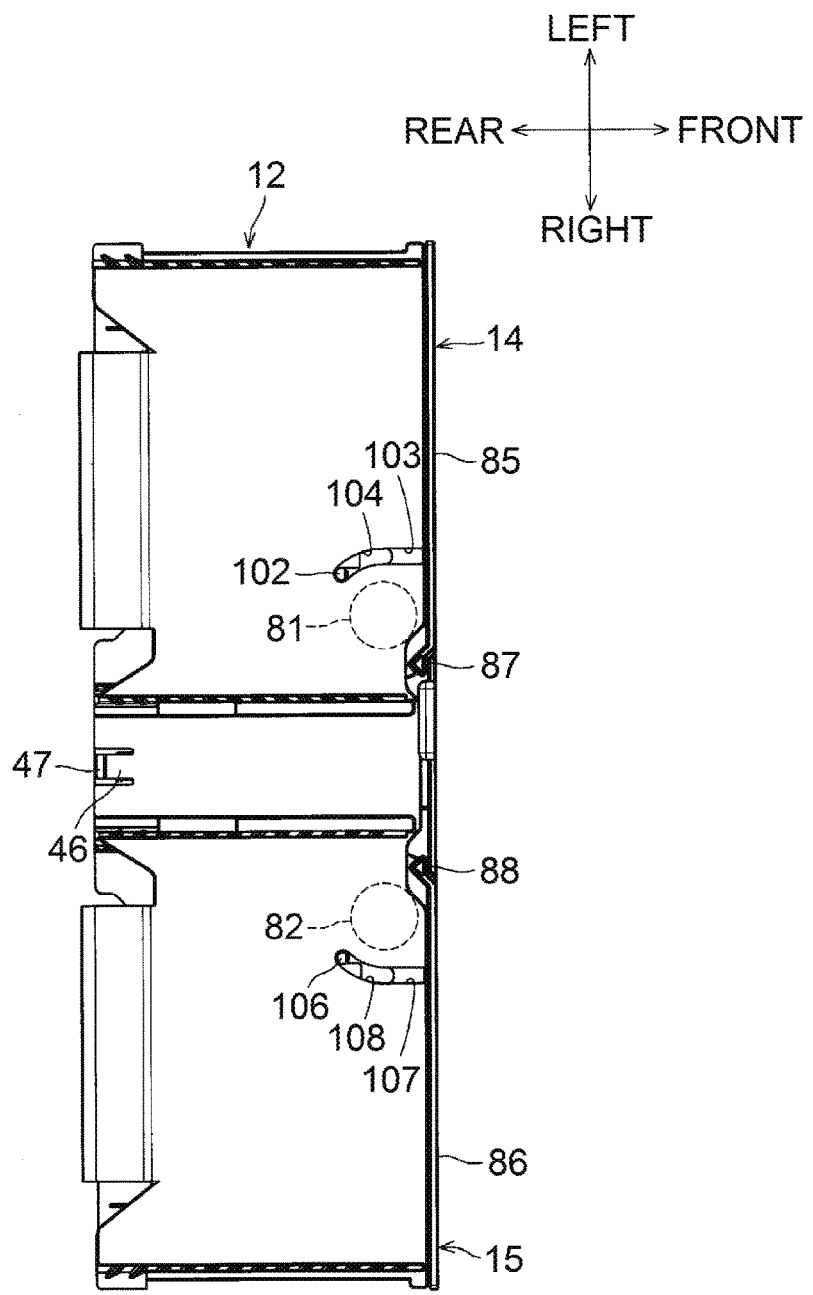
FIG. 8 is a bottom view illustrating the first slide tray, the second slide tray, and the pivotable trays, wherein the second slide tray is at the stored position, and the pivotable trays are at the first stowed position and the second stowed position, respectively.
Figure 9:
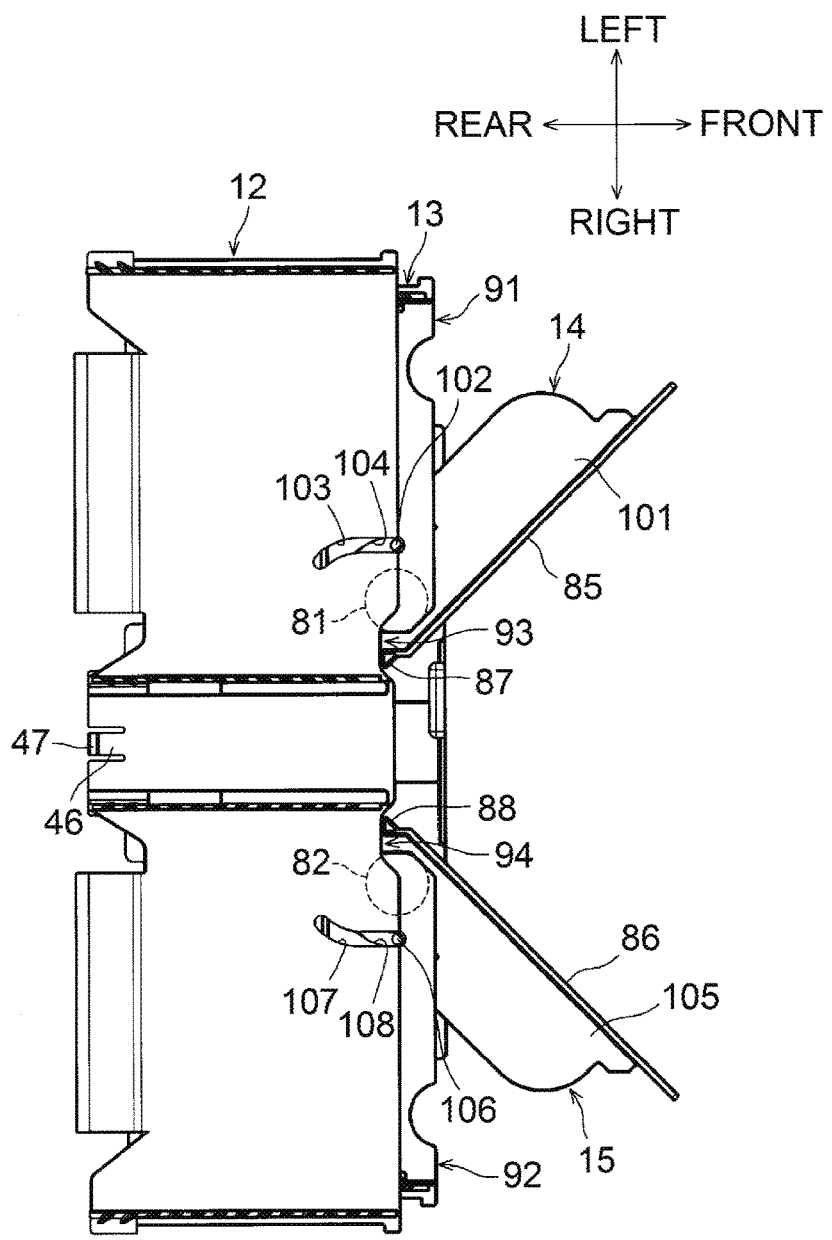
FIG. 9 is a bottom view of the first slide tray, the second slide tray and the pivotable trays, wherein the second slide tray is moved from the stored position slightly toward the extended position, and the pivotable trays are at the first extended position and the second extended position, respectively, and columnar portions are located in cutouts and aligned with a front edge of the first slide tray.
Figure 10:
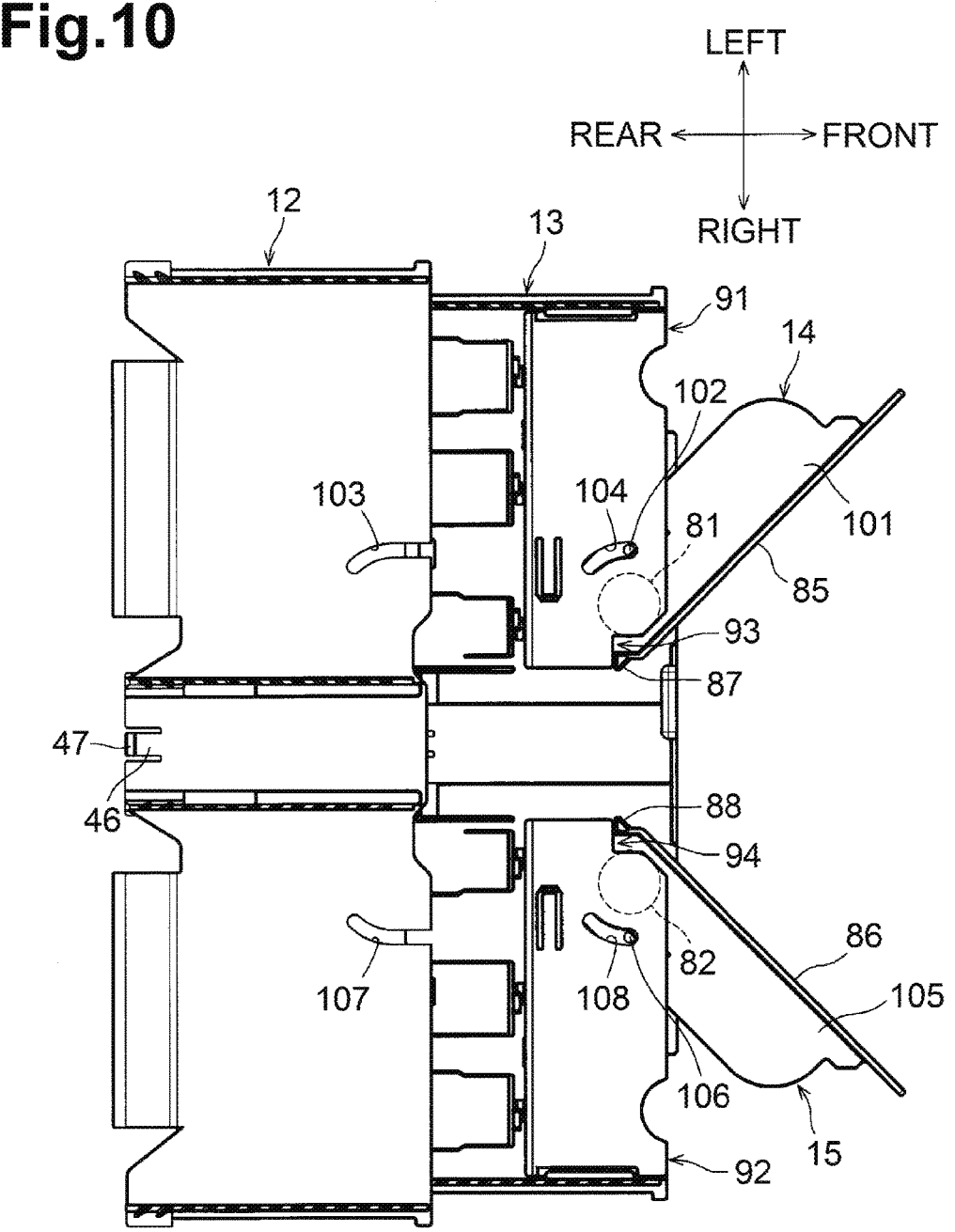
FIG. 10 is a bottom view illustrating the first slide tray, the second slide tray and the pivotable trays, wherein the second slide tray is at the extended position, and the pivotable trays are at the first extended position and the second extended position, respectively.

As illustrated in FIGS. 8-10, the pivotable trays 14, 15 includes walls 85, 86, respectively. The walls 85, 86 protrude downward along front ends of the pivotable trays 14, 15, respectively, and. The walls 85, 86 include V-shaped end portions 87, 88 (an example of a protrusion), respectively, which are located toward a central portion of the second slide tray 13 in the left-right direction.

As illustrated in FIGS. 9 and 10, covers 91, 92 are attached to the lower surface 75 of the second slide tray 13. The pivotable tray 14 is sandwiched between the lower surface 75 of the second slide tray 13 and the cover 91, while the pivotable tray 15 is sandwiched between the lower surface 75 of the second slide tray 13 and the cover 92. The covers 91, 92 are identical in shape and symmetrically arranged. As illustrated in FIG. 8, when the pivotable trays 14, 15 are located at the first stowed position and the second stowed position, respectively, the walls 85, 86 are in contact with the front ends of the covers 91, 92, respectively, and the covers 91, 92 cover substantially the entire areas of the pivotable trays 14, 15 except for the walls 85, 86. The cover 91 is devoid of a front right corner to define a rectangular cutout 93, and the cover 92 is devoid of a front left corner to define a rectangular cutout 94. When the pivotable tray 14 pivots from the first stowed position toward the first extended position, and the pivotable tray 15 pivots from the second stowed position toward the second extended position, the end portion 87 of the wall 85 moves into the cutout 93 and the end portion 88 moves into the cutout 94. As illustrated in FIG. 10, when the pivotable trays 14, 15 are located at the first extended position and the second extended position, respectively, the end portion 87 of the wall 85 contacts the edge defining the cutout 93 and the end portion 88 of the wall 86 contacts the edge defining the cutout 94. These contacts restrict the pivotable trays 14, 15 from pivoting beyond the first extended position and the second extended position. In other words, the edges defining the cutouts 93, 94 each function as a stopper to determine pivoting movements of the pivotable trays 14, 15.

The pivotable tray 14 includes a lower surface 101 and a columnar portion 102 protruding downward from the lower surface 101. The columnar portion 102 is located to the rear left of the pivot shaft 81 when the pivotable tray 14 is at the first stowed position. The first slide tray 12 includes a cutout 103, and the cover 91 includes a cover cutout 104. The cutout 103 is shaped like a slit extending along a path where the columnar portion 102 moves when the pivotable tray 14 moves to the first extended position under a non-use state where the second slide tray 13 and the pivotable tray 14 are located at the stored position and the first stowed position, respectively. The cutout 103 is open to or extends to a front edge of the first slide tray 12. The cover cutout 104 is shaped like a slit extending along a path where the columnar portion 102 moves when the pivotable tray 14 moves from the first stowed position to the first extended position. As illustrated in FIG. 8, under the non-use state, the position of the cover cutout 104 matches the position of the cutout 103 in the top-bottom direction. Both ends of the cover cutout 104 are closed or the cover cutout 104 does not extend to any edge of the cover 91. This configuration obviates reduction in strength of the cover 91.

The pivotable tray 15 includes a lower surface 105 and a columnar portion 106 protruding downward from the lower surface 105. The columnar portion 106 is located to the rear right of the pivot shaft 82 when the pivotable tray 15 is at the second stowed position. The first slide tray 12 includes a cutout 107, and the cover 92 includes a cover cutout 108. The cutout 107 is shaped like a slit extending along a path where the columnar portion 106 moves when the pivotable tray 15 moves to the second extended position under a non-use state where the second slide tray 13 and the pivotable tray 15 are located at the stored position and the second stowed position, respectively. The cutout 107 is open to or extends to the front edge of the first slide tray 12. The cover cutout 108 is shaped like a slit extending along a path where the columnar portion 106 moves when the pivotable tray 15 moves from the second stowed position to the second extended position. Under the non-use state, the position of the cover cutout 108 matches the position of the cutout 107 in the top-bottom direction. Both ends of the cover cutout 108 are closed or the cover cutout 108 does not extend to any edge of the cover 92. This configuration obviates reduction in strength of the cover 92.

<Tray Movement>

As illustrated in FIG. 8, under the non-use state where the second slide tray 13 is located at the stored position, and the pivotable trays 14, 15 are located at the first stowed position and the second stowed position, respectively, the columnar portion 102 is located in the cutout 103 and the cover cutout 104, and the columnar portion 106 is located in the cutout 107 and the cover cutout 108.

As the second slide tray 13 is slid toward the extended position from the non-use state, the columnar portions 102, 106 move along the cutouts 103, 107, respectively. During the movement of the columnar portions 102, 106, the pivotable tray 14 pivots from the first stowed position toward the first extended position, while the pivotable tray 15 pivots from the second stowed position toward the second extended position. When the pivotable trays 14, 15 reach the first extended position and the second extended position, respectively, the end portion 87 of the wall 85 of the pivotable tray 14 contacts the edge defining the cutout 93 of the cover 91, and the end portion 88 of the wall 86 of the pivotable tray 15 contacts the edge defining the cutout 94 of the cover 92, thereby restricting further pivoting of the pivotable trays 14, 15.

Then, when the second slide tray 13 is further slid toward the extended position, as illustrated in FIG. 9, the columnar portions 102, 106 are disengaged from the cutouts 103, 107, respectively. As illustrated in FIG. 10, when the second slide tray 13 reaches the extended position, the pivotable trays 14, 15 are located at the first extended position and the second extended position, respectively, and the second slide tray 13 and the pivotable trays 14, 15 are available or in a use state.

Figure 11:
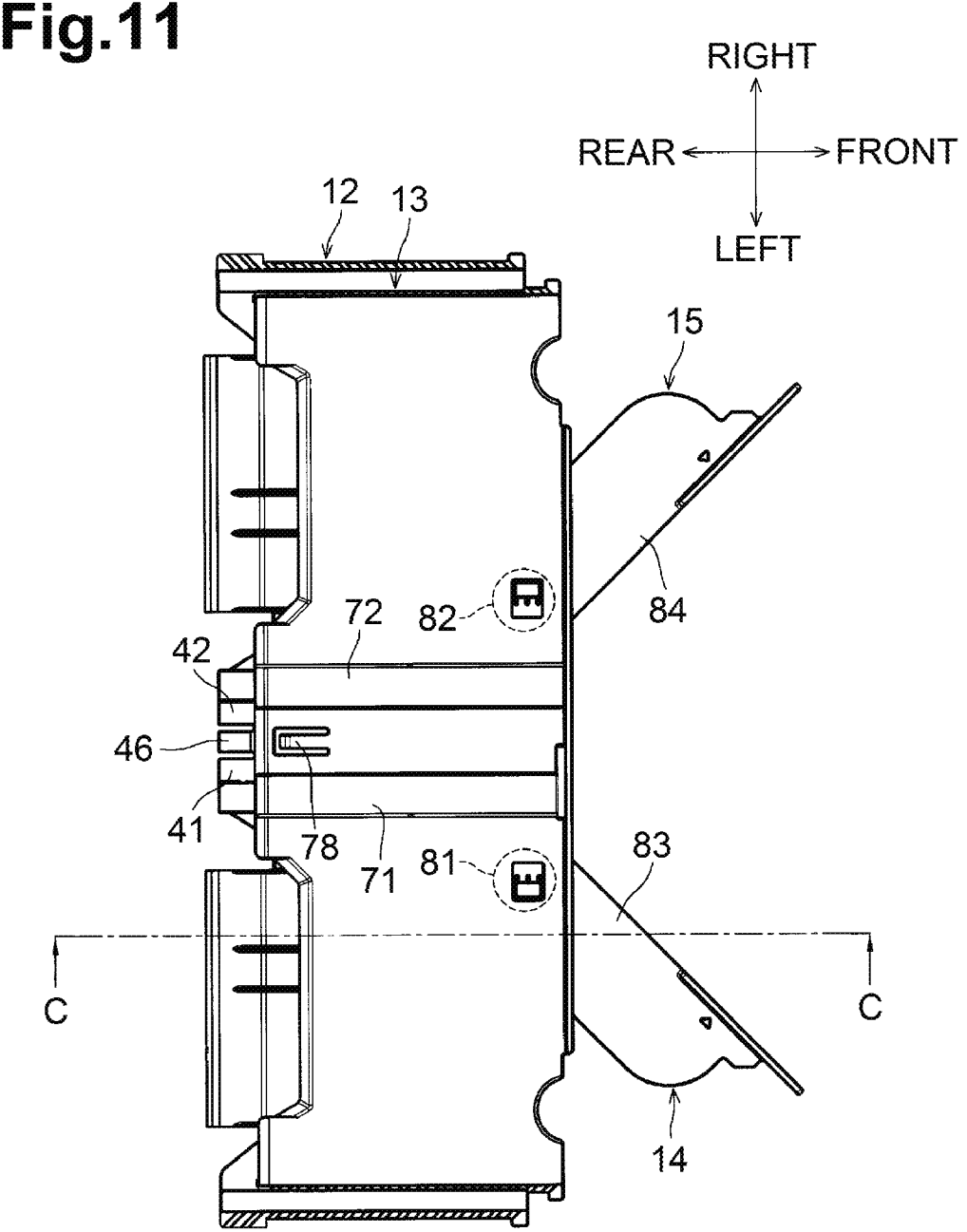
FIG. 11 is a plan view illustrating the first slide tray, the second slide tray, and the pivotable trays, wherein the pivotable trays are at the first extended position and the second extended position, respectively.
Figure 12:
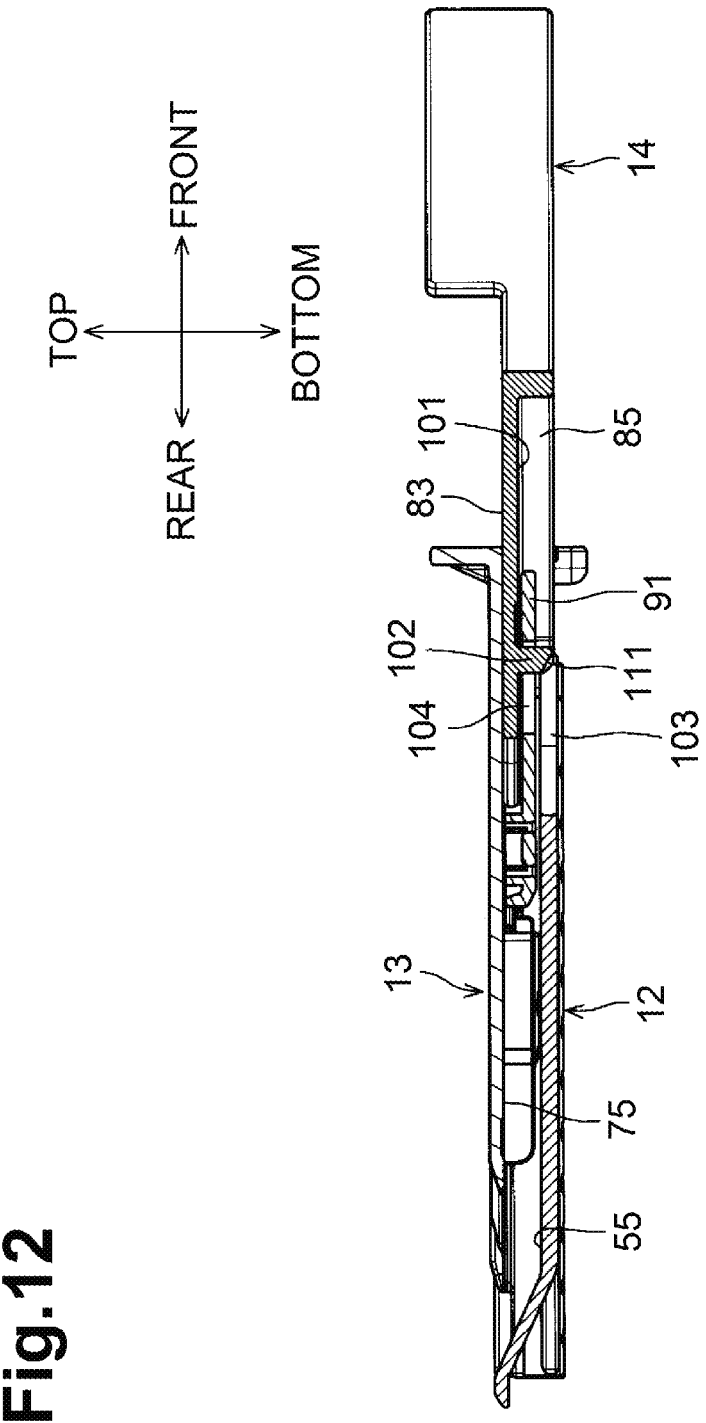
FIG. 12 is a cross sectional view illustrating the first slide tray, the second slide tray, and the first pivotable tray, taken along line C-C of FIG. 11.

As illustrated in FIG. 11, while the second slide tray 13 is slid from the use state, i.e., the extended position, toward the stored position with the pivotable trays 14, 15 remaining at the first extended position and the second extended position, respectively, the columnar portions 102, 106 enter the open front ends of the cutouts 103, 107, respectively. In FIG. 12, the columnar portion 102 is illustrated as being located on the front edge of the cutout 103. When the second slide tray 13 is further slid toward the stored position, the columnar portions 102, 106 move along the cutouts 103, 107, causing the pivotable trays 14 and 15 to pivot from the first extended position and the second extended positon toward the first stowed position and the second stowed position, respectively. When the pivotable trays 14, 15 reach the first stowed position and the second stowed position, respectively, the wall 85 of the pivotable tray 14 and the wall 86 of the pivotable tray 14 contact front edges of the covers 91, 92, thereby restricting further pivoting of the pivotable trays 14, 15. Then, when the second slide tray 13 reaches the stored position, the second slide tray 13 and the pivotable trays 14, 15 return to the non-use state.

Figure 13:
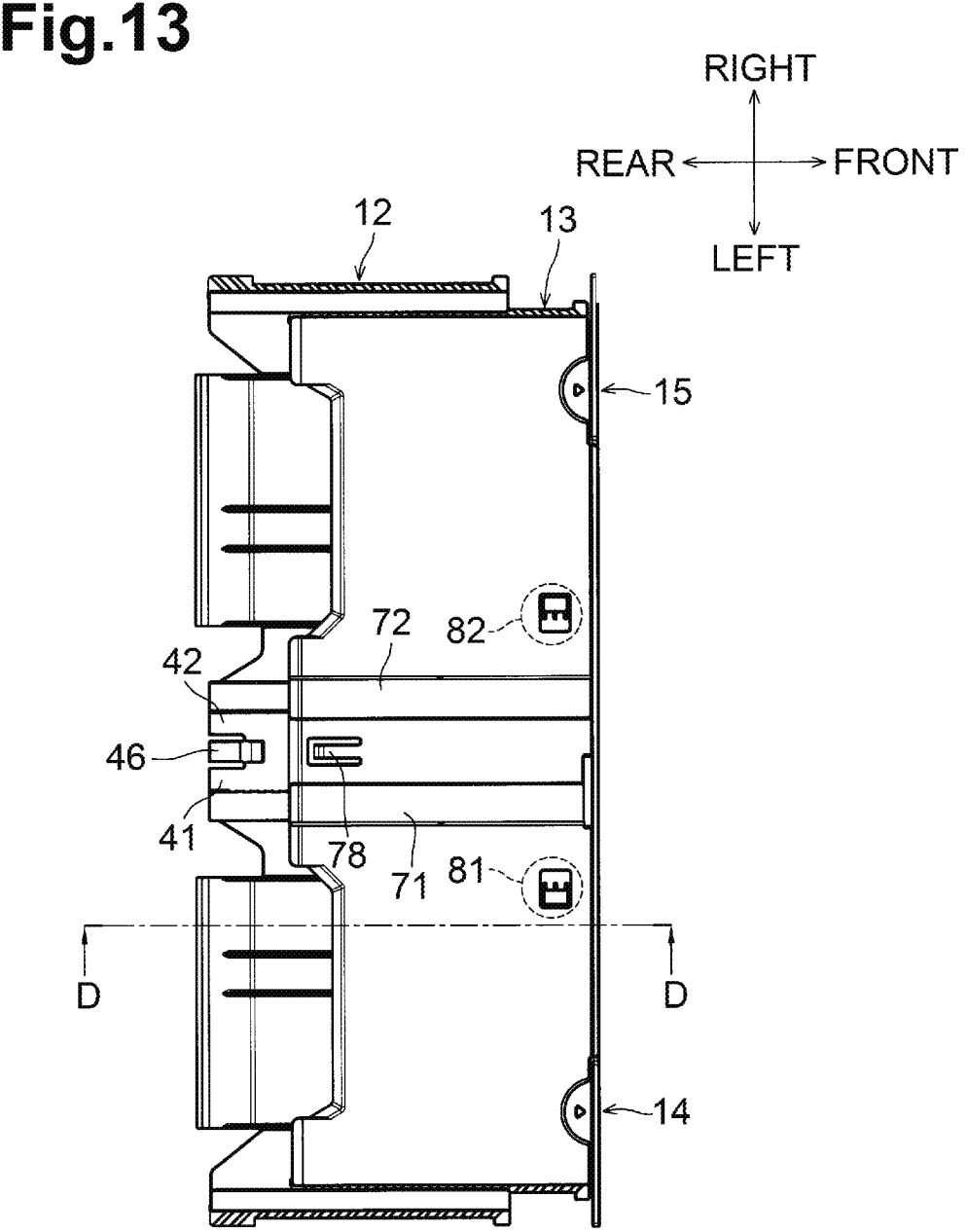
FIG. 13 is a plan view illustrating the first slide tray, the second slide tray and the first and second pivotable trays, wherein the first and second pivotable trays are at the first stowed position and the second stowed position, respectively, walls of the first and second pivotable trays are in contact with a front edge of the second slide tray.
Figure 14:
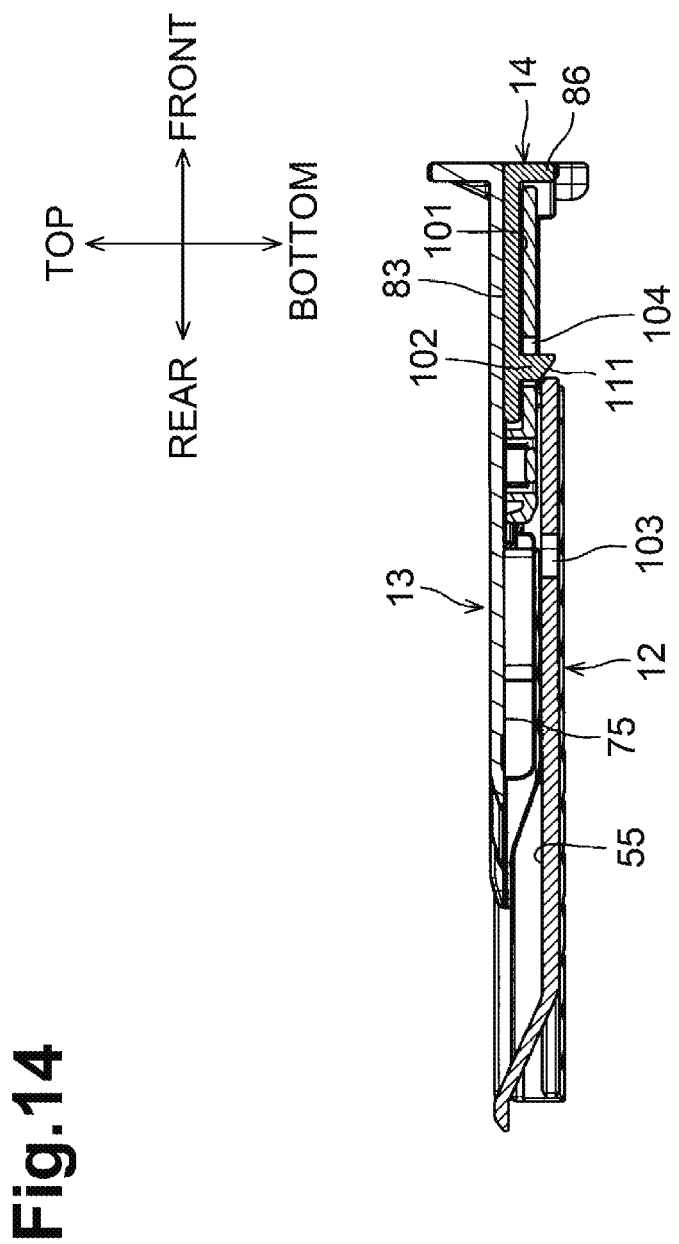
FIG. 14 is a cross sectional view illustrating the first slide tray, the second slide tray, and the first pivotable tray, taken along line C-C of FIG. 13.

As illustrated in FIG. 13, when the pivotable trays 14, 15 are returned from the use state to the first stowed position and the second stowed position, and then the second slide tray 13 is slid toward the extended position, the columnar portions 102, 106 move in the cover cutouts 104, 108, respectively, from positions facing the front edges of the cutouts 103, 107 in the front-rear direction. Thus, when the second slide tray 13 is on the way to the extended position, the columnar portions 102, 106 contact the front edge of the first slide tray 12 from the front without entering the cutouts 103, 107. In FIG. 14, the columnar portion 102 is illustrated as contacting the front edge of the first slide tray 12. The columnar portions 102, 106 each include an inclined surface 111 inclined upward toward the rear. When the first slide tray 12 is moved toward the accommodated position after the columnar portions 102, 106 contact the front edge of the first slide tray 12, respective inclined surfaces 111 apply, to the first slide tray 12, a force to press the front end portion of the first slide tray 12 downward. This causes the front end portion of the first slide tray 12 to become deformed and causes the columnar portions 102, 106 to ride on the upper surface 55 of the first slide tray 12. When the second slide tray 13 is slid further toward the extended position, the columnar portions 102, 106 are fitted into the cutouts 103,107, respectively, and the front end portion of the first slide tray 12 returns to its original state. Then, when the second slide tray 13 reaches the stored position, the second slide tray 13 and the pivotable trays 14, 15 returns to the non-use state.

Advantageous Effects

As described above, the central guide portions 71, 72, the left end guide portion 73, and the right end guide portion 74 of the second slide tray 13 slidably engage the central guide portions 41, 42, the left end guide portion 63, and the right end guide portion 64 of the first slide tray 12, respectively, and thus the second slide tray 13 moves between the stored position and the extended position. When the second slide tray 13 is located at the stored position, the upper surface 55 of the first slide tray 12 greatly overlaps the lower surface 75 of the second slide tray 13 in the top-bottom direction. When the second slide tray 13 is located at the extended position, an overlap between the upper surface 55 and the lower surface 75 is smaller than the overlap therebetween when the second slide tray 13 is located at the stored position, and an area occupied by the first slide tray 12 and the second slide tray 13 viewed in the top-bottom direction is increased.

The upper surfaces 83, 84 of the pivotable trays 14, 15 extends parallel to the lower surface 75 of the second slide tray 13, and are supported by the lower surface 75 such that the pivotable trays 14, 15 may be pivotable about the pivot shafts 81, 82, respectively. The pivotable tray 14 is pivotable about the pivot shaft 81 extending in the top-bottom direction, and movable between the first stowed position and the first extended position. The pivotable tray 15 is pivotable about the pivot shaft 82 extending in the top-bottom direction and movable between the second stowed position and the second extended position. When the pivotable trays 14, 15 are located at the first stowed position and the second stowed position, respectively, the respective upper surfaces 83, 84 greatly overlap the lower surface 75 of the second slide tray 13 in the orthogonal direction. When the pivotable trays 14, 15 are located at the first extended position and the second extended position, respectively, an overlap between the lower surface 75 of the second slide tray 13 and each of the upper surfaces 83, 84 is smaller than the overlap therebetween when the pivotable trays 14, 15 are located at the first stored position and the second stowed position, and an area occupied by the second slide tray 13 and the pivotable trays 14, 15 viewed in the top-bottom direction is increased.

Thus, in the non-use state where the second slide tray 13 is located at the stored position, and the pivotable trays 14, 15 are located at the first stowed position and the second stowed position, respectively, when the second slide tray 13 is moved toward the extended position, pivotable trays 14, 15 are moved toward the first extended position and the second extended position, and an area occupied by the first slide tray 12, the second slide tray 13 and the pivotable trays 14, 15 viewed in the top-bottom direction is increased. As a result, in the use state where the second slide tray 13 is located at the extended position, and the pivotable trays 14, 15 are located at the first extended position and the second extended position, respectively, the first slide tray 12, the second slide tray 13 and the pivotable trays 14, 15 are capable of reliably supporting a sheet, which is long in the front-rear direction.

The pivotable trays 14, 15 include the columnar portions 102, 106, respectively. The first slide tray 12 includes the cutouts 103, 107. The cutout 103 is shaped along the path where the columnar portion 102 moves when the pivotable tray 14 moves from the non-use state to the first extended position. The cutout 107 is shaped along the path where the columnar portion 106 moves when the pivotable tray 15 moves from the non-use state to the second extended position. Thus, when the second slide tray 13 moves from the stored position to the extended position, the columnar portions 102, 106 move along the cutouts 103, 107, causing the pivotable tray 14 to move from the first stowed position to the first extended position, and the pivotable tray 15 to move from the second stowed position to the second extended position. Thus, the second slide tray 13 and the two pivotable trays 14, 15 are changed from the non-use state to the use state in one step of moving the second slide tray 13 from the stored position to the extended position.

When the pivotable trays 14, 15 are located at the first extended position and the second extended position, respectively, the end portion 87 of the wall 85 of the pivotable tray 14 and the end portion 88 of the wall 86 of the pivotable tray 15 contact the covers 91, 92, thereby restricting the pivotable trays 14, 15 from pivoting beyond the first extended position and the second extended position. Thus, when the second slide tray 13 is slid from the extended position toward the stored position with the pivotable trays 14, 15 being kept at the first extended position and the second extended position, the columnar portions 102, 106 smoothly enter the open front ends of the cutouts 103, 107, respectively. Consequently, the second slide tray 13 can be smoothly slid, and the pivotable trays 14, 15 can be smoothly pivoted to the first stowed position and the second stowed position, respectively.

The covers 91, 92 enhance strength of the pivotable trays 14, 15, prevent or reduce downward deformation of the pivotable trays 14, 15, and function as stoppers to limit pivoting of the pivotable trays 14, 15.

The cover 91 includes the cover cutout 104 shaped along the path where the columnar portion 102 moves when the pivotable tray 14 moves from the first stowed position to the first extended position. The cover 92 includes the cover cutout 108 shaped along the path where the columnar portion 106 moves when the pivotable tray 15 moves from the second stowed position to the second extended position. The columnar portions 102, 106 are movable in the cover cutouts 104, 108, respectively. Thus, the covers 91, 92 cover most of the pivotable trays 14, 15, and effectively reinforce the pivotable trays 14, 15 when the pivotable trays 14, 15 are located at the first stowed position and the second stowed position, respectively. The covers 91, 92 do not hinder the movement of the columnar portions 102, 106 when the pivotable trays 14, 15 move toward the first extended positon and the second extended position, respectively.

Alternative Embodiments

While the disclosure has been described in detail with reference to the specific embodiment thereof, this is merely an example, and various changes, arrangements and modifications may be applied therein without departing from the spirit and scope of the disclosure.

Figure 15:
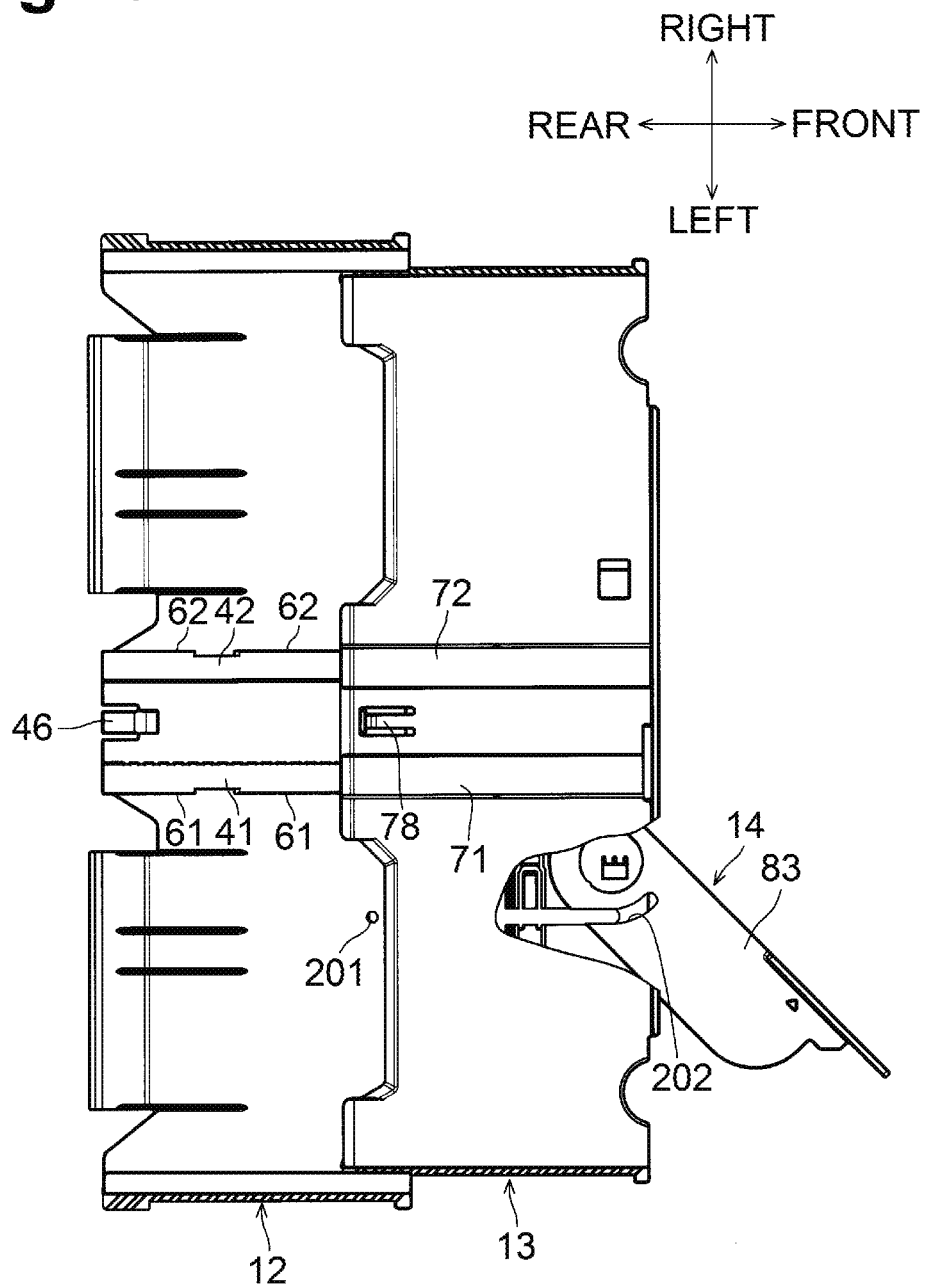
FIG. 15 is a plan view of a first slide tray, a second slide tray, and a pivotable tray according to a modification of the disclosure.

The above embodiment illustrates that pivotable tray 14 includes the columnar portion 102, the pivotable tray 15 includes the columnar portion 106, and the first slide tray 12 includes the cutouts 103, 107. When the second slide tray 13 is slid, the columnar portions 102, 106 move along the respective cutouts 103,107, the pivotable tray 14 pivots between the first stowed position and the first extended position, and the pivotable tray 15 pivots between the second stowed position and the second extended position. Alternatively, as illustrated in FIG. 15, the upper surface 55 of the first slide tray 12 may have a columnar portion 201, and the pivotable tray 14 may have a cutout 202. The pivotable tray 14 may pivot between the first stowed position and the first extended position as the columnar portion 201 moves along the cutout 202 in accordance with sliding movement of the second slide tray 13. The pivotable tray 15 may have same structure as the pivotable tray 14.

The above embodiment shows, but is not limited to, the printer 1 as an example of an image forming apparatus. The image forming apparatus to which the disclosure is applied may be not only the single-function printer 1 but also a facsimile device or multi-function device, which has an image forming function and an image reading function.

The disclosure may be applied to any other device including a sheet tray supporting a sheet in addition to the image forming apparatus.

What is claimed is:
1. A sheet tray comprising:
 a first tray including:
  a first surface extending in a first direction and a second direction orthogonal to the first direction; and
  a first guide portion extending along the first surface in the first direction;
 a second tray including:
  a second surface extending parallel to the first surface; and
  a second guide portion slidably engaging the first guide portion, the second tray being configured to move between a stored position where the second surface overlaps the first surface of the first tray in an orthogonal direction to the first surface and an extended position where an overlap between the first surface and the second surface is smaller in the first direction than the overlap between the first surface and the second surface with the second tray at the stored position; and
 a third tray including a third surface extending parallel to the second surface, the third tray being pivotally supported by the second surface of the second tray via a pivot shaft extending in the orthogonal direction, the third tray being pivotable about the pivot shaft between a first stowed position where the third surface overlaps the second surface in the orthogonal direction and a first extended position where an overlap between the third surface and the second surface is smaller than the overlap between the third surface and the second surface when the third tray is at the first stowed position,
  wherein one of the first tray and the third tray includes a columnar portion extending in the orthogonal direction, the columnar portion protruding toward the other of the first tray and the third tray in an area where, when the second tray is located at the stored position and the third tray is located at the first stowed position, the first tray overlaps the third tray in the orthogonal direction, and wherein the other of the first tray and the third tray includes a cutout shaped along a path where the columnar portion moves when the third tray moves from the first stowed position to the first extended position.

2. The sheet tray according to claim 1,
wherein the third tray includes the columnar portion, and
wherein the first tray includes the cutout.

3. The sheet tray according to claim 2,
wherein the cutout is open to a downstream edge of the first tray in a direction in which the columnar portion moves along with movement of the third tray from the first stowed position toward the first extended position, and wherein the sheet tray further comprises a stopper configured to, when the columnar portion is disengaged from the cutout, restrict pivoting of the third tray over the first extended position.

4. The sheet tray according to claim 3, further comprising a cover attached to the second tray such that the cover and the second surface of the second tray sandwich the third tray therebetween, wherein a part of the cover functions as the stopper.

5. The sheet tray according to claim 4,
wherein the third tray includes a protrusion such that the protrusion approaches the cover in accordance with movement from the first stowed position to the first extended position, and wherein the part of the cover is configured to, when the third tray is located at the first extended position, contact the protrusion.

6. The sheet tray according to claim 2, further comprising a cover attached to the second tray such that the cover and the second surface of the second tray sandwich the third tray therebetween, wherein the cover includes a cover cutout shaped along a path where the columnar portion moves along with movement of the third tray from the first stowed position to the first extended position.

7. The sheet tray according to claim 6,
wherein the cover cutout does not extend to a downstream edge of the cover in a direction in which the columnar portion moves along with movement of the third tray from the first stowed position toward the first extended position.

8. The sheet tray according to claim 1, further comprising a fourth tray including a fourth surface coplanar with the third surface of the third tray, the fourth tray being pivotally supported by the second surface of the second tray via a fourth tray pivot shaft extending in the orthogonal direction, the fourth tray being pivotable about the fourth tray pivot shaft between a second stowed position where the fourth surface overlaps the second surface in the orthogonal direction and a second extended position where an overlap between the fourth surface and the second surface is smaller than the overlap between the fourth surface and the second surface when the fourth tray is at the second stowed position.

9. The sheet tray according to claim 8,
wherein the second guide portion is located at a central portion of the second tray in the second direction, and
wherein the pivot shaft of the third tray is located at one side of the second tray relative to the second guide portion and the fourth tray pivot shaft of the fourth tray is located at the other side of the second tray relative to the second guide portion.

10. The sheet tray according to claim 9,
wherein the first guide portion includes a first restriction portion, and the second guide portion includes a second restriction portion, the first restriction portion and the second restriction portion being configured to restrict a separation of the first tray and the second tray in the orthogonal direction, wherein the first tray includes a first raised portion raised from the first surface at a downstream end portion of the first tray in the first direction, and wherein the second tray includes a claw portion configured to, when the second tray moves between the extended position and the extended position, move over the first raised portion of the first tray.

11. The sheet tray according to claim 10,
wherein the first tray includes a second raised portion raised from the first surface at an upstream end portion of the first tray in the first direction, the claw portion of the second tray being configured to, when the second tray moves between the extended position and the extended position, further move over the second raised portion of the first tray.

12. The sheet tray according to claim 10,
wherein the first raised portion has a first inclined surface inclined downward in the first direction and a second inclined surface inclined downward in a direction opposite to the first direction, and wherein an angle formed between the first surface and the first inclined surface is greater than an angle formed between the first surface and the second inclined surface.

13. The sheet tray according to claim 11,
wherein the second raised portion has a third inclined surface inclined downward in the first direction and a fourth inclined surface inclined downward in a direction opposite to the first direction, and wherein an angle formed between the first surface and the fourth inclined surface is greater than an angle formed between the first surface and the third inclined surface.

14. An image forming apparatus comprising:
an image forming device configured to form an image on a sheet; and
a sheet tray configured to support thereon the sheet conveyed to the image forming device, the sheet tray including:
a first tray including:
a first surface extending in a first direction and a second direction orthogonal to the first direction; and
a first guide portion extending along the first surface in the first direction;
a second tray including:
a second surface extending parallel to the first surface; and
a second guide portion slidably engaging the first guide portion, the second tray being configured to move between a stored position where the second surface overlaps the first surface of the first tray in an orthogonal direction to the first surface and an extended position where an overlap between the first surface and the second surface is smaller in the first direction than the overlap between the first surface and the second surface with the second tray at the stored position; and
a third tray including a third surface extending parallel to the second surface, the third tray being pivotally supported by the second surface of the second tray via a pivot shaft extending in the orthogonal direction, the third tray being pivotable about the pivot shaft between a first stowed position where the third surface overlaps the second surface in the orthogonal direction and a first extended position where an overlap between the third surface and the second surface is smaller than the overlap between the third surface and the second surface when the third tray is at the first stowed position, wherein one of the first tray and the third tray includes a columnar portion extending in the orthogonal direction, the columnar portion protruding toward the other of the first tray and the third tray in an area where, when the second tray is located at the stored position and the third tray is located at the first stowed position, the first tray overlaps the third tray in the orthogonal direction, and wherein the other of the first tray and the third tray includes a cutout shaped along a path where the columnar portion moves when the third tray moves from the first stowed position to the first extended position.

\* \* \* \* \*